(12) United States Patent
Higuchi et al.

(10) Patent No.: US 7,613,799 B2
(45) Date of Patent: Nov. 3, 2009

(54) SERVICE EVALUATION METHOD, SYSTEM, AND COMPUTER PROGRAM PRODUCT

(75) Inventors: Masaya Higuchi, Yamato (JP); Kazuo Iwao, Yokohama (JP); Masabumi Koinuma, Cary, NC (US); Sari Shimizu, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 11/611,169

(22) Filed: Dec. 15, 2006

(65) Prior Publication Data

US 2007/0168460 A1    Jul. 19, 2007

(30) Foreign Application Priority Data

Dec. 28, 2005  (JP)  ............... 2005-377852

(51) Int. Cl.
 G06F 15/173  (2006.01)
 G06F 15/16  (2006.01)
(52) U.S. Cl. ...................... 709/223; 709/219
(58) Field of Classification Search ......... 709/201–203, 709/217–219, 223–229; 705/7, 10
See application file for complete search history.

(56) References Cited

U.S. PATENT DOCUMENTS 7,065,494 B1 *   6/2006  Evans ..................... 705/10
2002/0072943 A1 * 6/2002  Usami et al. ............. 705/7

FOREIGN PATENT DOCUMENTS

| JP | 2003248728 | 9/2003 |
| JP | 2004-094508 | 3/2004 |
| JP | 2004110620 | 4/2004 |
| JP | 2005032150 | 3/2005 |
| JP | 2005078525 | 3/2005 |
| JP | 2005-173991 | 6/2005 |

* cited by examiner

*Primary Examiner*—Joseph E Avellino
*Assistant Examiner*—Kiet Tang
(74) *Attorney, Agent, or Firm*—Shimokaji & Associates, P.C.; Rob Straight

(57) ABSTRACT

In order to provide information for making a decision when using composite services, there are provided means for calculating evaluation of combinations of services and means for visualizing the evaluations are provided. For this purpose, a method applied to a system having storage means includes receiving a selection of a plurality of service groups from one user; and computing an evaluation of combinations of services composed by selecting one service from among respective service groups of the plurality of service groups selected, based on evaluation information stored in the storage means.

12 Claims, 8 Drawing Sheets

SERVICE EVALUATION METHOD, SYSTEM, AND COMPUTER PROGRAM PRODUCT

FIELD OF THE INVENTION

The present invention relates to a technique for evaluating services provided via the Internet, and more particularly to a technique for evaluating combinations of services.

BACKGROUND

In recent years, to improve the efficiency of company processes and to enable prompt reactions to a change in business environment, a demand has arisen for changes in IT processes in which various types of services provided on a network are combined. With an increase in the types of services provided by various kinds of service providers, it has become necessary for a company on the service user side to configure an optimal combination of services. On the other hand, service integrators act as hubs for providing various services, and thus release information on directories according to the types of services, and provide these services for fees according to traffic volume.

In this regard, Japanese Unexamined Patent Publication (Kokai) No. 2005-78525 discloses a technique of searching a service, in case of using Web Services, according to a policy from among various services, and a technique of searching a single service as a target. Japanese Unexamined Patent Publication (Kokai) No. 2004-110620 discloses a technique of establishing integrated Web Services for dynamically integrating a plurality of Web Services, and dynamically integrating a plurality of Web services into a single Web service. In addition, Japanese Unexamined Patent Publication (Kokai) No. 2003-248728 discloses a technique of autonomously determining, in case of using Web Services, a service to be used. Furthermore, Japanese Unexamined Patent Publication (Kokai) No. 2005-32150 discloses a technique of obtaining directory information on a Web Service corresponding to a search condition.

However, none of these disclose a quantitative evaluation to determine what services should be selected and how the services should be combined on the user side so as to be most likely to meet the policy of the user side.

SUMMARY OF THE INVENTION

Aspects of the present invention provide means for calculating evaluations in reference to combinations of services and means for visualizing the evaluations, in order to provide information for making a decision when a user's company compositely uses services.

Aspects of the invention include a method applied to a system having storage means, the method containing a step of receiving a selection of a plurality of service groups from one user, and a step of computing a combination of services being composed by selecting one service from among respective service groups of the concerned plurality of service groups selected, based on evaluation information stored in the storage means.

Other aspects of the invention include a system containing storage means for storing evaluation information, input means for receiving a selection of a plurality of service groups from one user, and computing means for computing a combination of services being composed by selecting one service from among respective service groups of the concerned plurality of service groups selected, based on the concerned evaluation information.

Other aspects of the invention include a computer program product causing a computer to achieve a storage function of storing evaluation information, an input function of receiving a selection of a plurality of service groups from one user, and a computing function of computing a combination of services being composed by selecting one service from among respective service groups of the concerned plurality of service groups selected, based on the concerned evaluation information.

Furthermore, aspects of the invention include a method containing a step of mounting, on a system having storage means, a storage function of storing evaluation information, an input function of receiving a selection of a plurality of service groups from one user, and a computing function of computing a combination of services being composed by selecting one service from among respective service groups of the concerned plurality of service groups, based on the concerned evaluation information.

Thus, according to the present invention, in order to provide information for making a decision in case that a user's company compositely uses services, means for calculating evaluations in reference to combination of services and means for visualizing the evaluations may be provided.

BRIEF DESCRIPTION OF THE DRAWINGS

An embodiment of the present invention will be described below, appropriately referring to the drawings, wherein.

DETAILED DESCRIPTION

Figure 1:
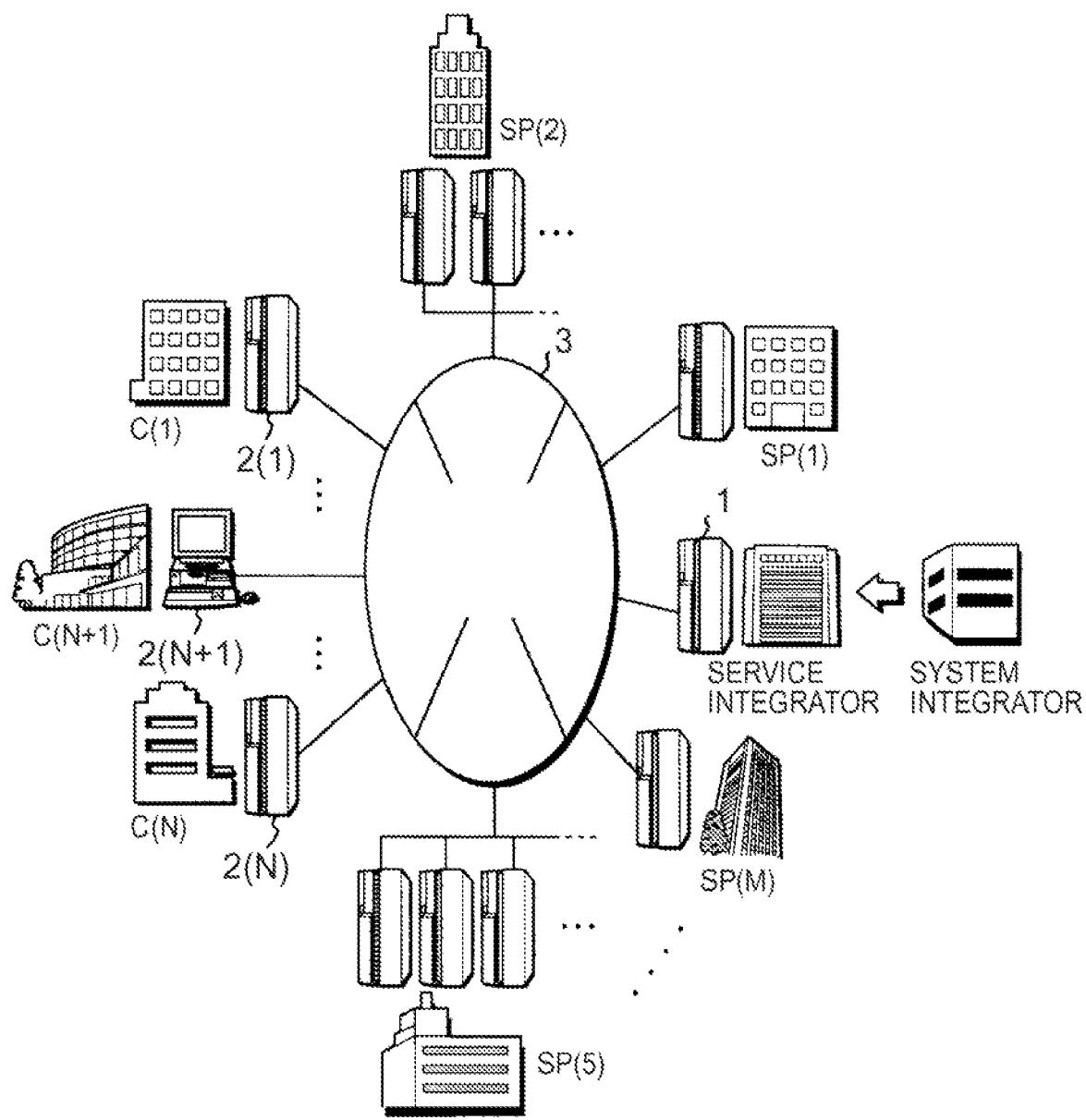
FIG. 1 is a diagram for describing a network system which includes an integration server (system)

FIG. 1 shows a whole network system including an integration server (system) 1. In the network system, the integration server 1 owned by a service integrator, a plurality of service servers owned by a plurality of web service providers (SP(1) to SP(M)) respectively, and a plurality of clients 2 owned by a plurality of existing users C(1) to C(N) are interconnected to one another via the Internet 3. Each web service provider SP provides a plurality of types of services or the same type of a plurality of services to the existing users C(1) to C(N) via the integration server 1. That is to say, each web service provider SP registers contents of services provided by itself in a database in the integration server 1.

The service integrator composes service directories based on the contents of services registered by the web service providers SP and releases the service directories to the existing users and potential new users. A user operates the client 2 to search and compare necessary web services based on the service directories in the integration server 1, and thereby selects integrated services (a combination of a plurality of types of services) necessary for the user. The service integrator receives a certain margin from the service providers SP according to the types of services selected by the existing users or according to the number of transactions to services also used by the existing users.

Figure 2:
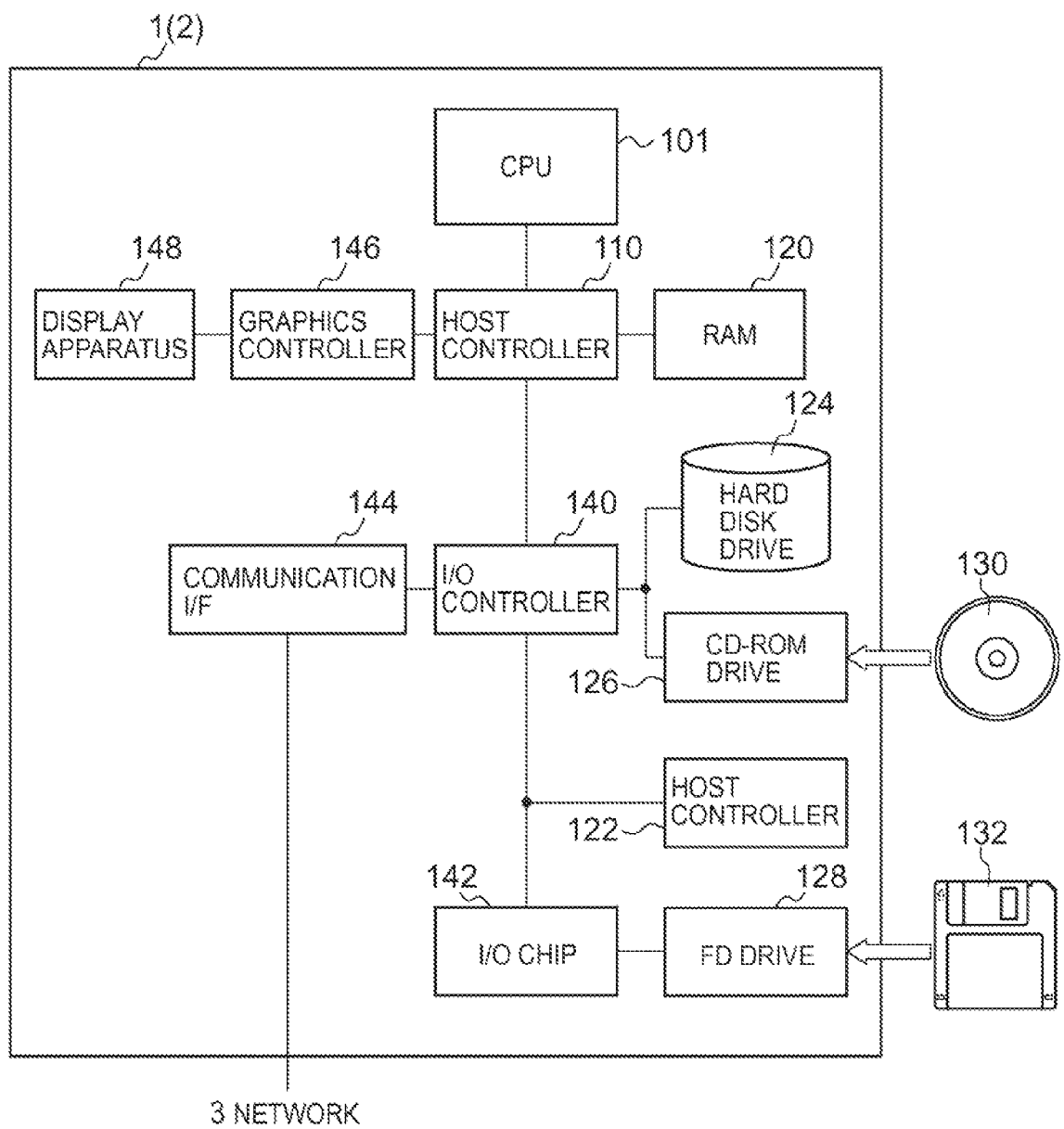
FIG. 2 is a schematic diagram for describing a hardware configuration of the integration server.

FIG. 2 is a schematic diagram for describing a hardware configuration of the integration server 1. Note that the clients 2 also have the same hardware configuration. The integration server 1 includes a CPU peripheral unit having a CPU 101, a RAM 120 and a graphics controller 146 which are interconnected to one another by a host controller 110, an I/O unit having a communication interface 144, a hard disk drive (auxiliary storage apparatus) 124 and a CD-ROM drive 126 which are connected to the host controller 110 by an I/O controller 140, and a legacy I/O unit (e.g., a flexible disk drive 128) having a ROM 122 and an I/O chip 142 which are connected to the I/O controller 140.

The host controller 110 connects the RAM 120 with the CPU 101 and the graphics controller 146 which access the RAM 120 at a high transfer rate. The CPU 101 operates based on programs stored in the ROM 122 and the RAM 120, and controls each unit. The graphics controller 146 obtains image data being generated on a frame buffer provided in the RAM 120 by the CPU 101, etc., and displays the image on a display apparatus 148. Instead of this, the graphics controller 146 may include therein a frame buffer storing image data generated by the CPU 101, etc.

The I/O controller 140 connects the host controller 110 with the communication interface 144, the hard disk drive 124, and the CD-ROM drive 126 which are relatively high-speed I/O apparatuses. The communication interface 144 may communicate with other apparatuses via a network 3. The hard disk drive 124 stores program products and data used by the computer. The CD-ROM drive 126 reads a program product or data from a CD-ROM 130, and provides the read program product or data to the I/O chip 142 through the RAM 120.

In addition, to the I/O controller 140, the ROM 122 and relatively low-speed I/O apparatuses (e.g., the flexible disk drive 128) such as the I/O chip 142, etc. are connected. The ROM 122 stores a boot program executed by the CPU 101 at the time of start-up of the computer, a program depending on the hardware of the computer, or the like. The flexible disk drive 128 reads a program or data from a flexible disk 132, and provides the program or data to the I/O chip 142 through the RAM 120. The I/O chip 142 connects various types of I/O apparatuses through the flexible disk drive 128, and for example, a parallel port, a serial port, a keyboard port, a mouse port or the like.

Next, a software configuration of the integration server 1 will be described. Computer programs (operating system and application programs for the server) are provided to the integration server 1 by being stored in a storage medium such as the flexible disk 132, the CD-ROM 130, a DVD-ROM, an IC card, or the like, or via a network. The programs are read from a storage medium and are installed on the integration server 1 through the I/O chip 142. Alternatively, the programs are read from other computer on the network and are installed on the integration server 1 through the communication interface 144 to be executed on the integration server 1. The functions of the computer program will be sequentially disclosed according to the following description.

Figure 3:
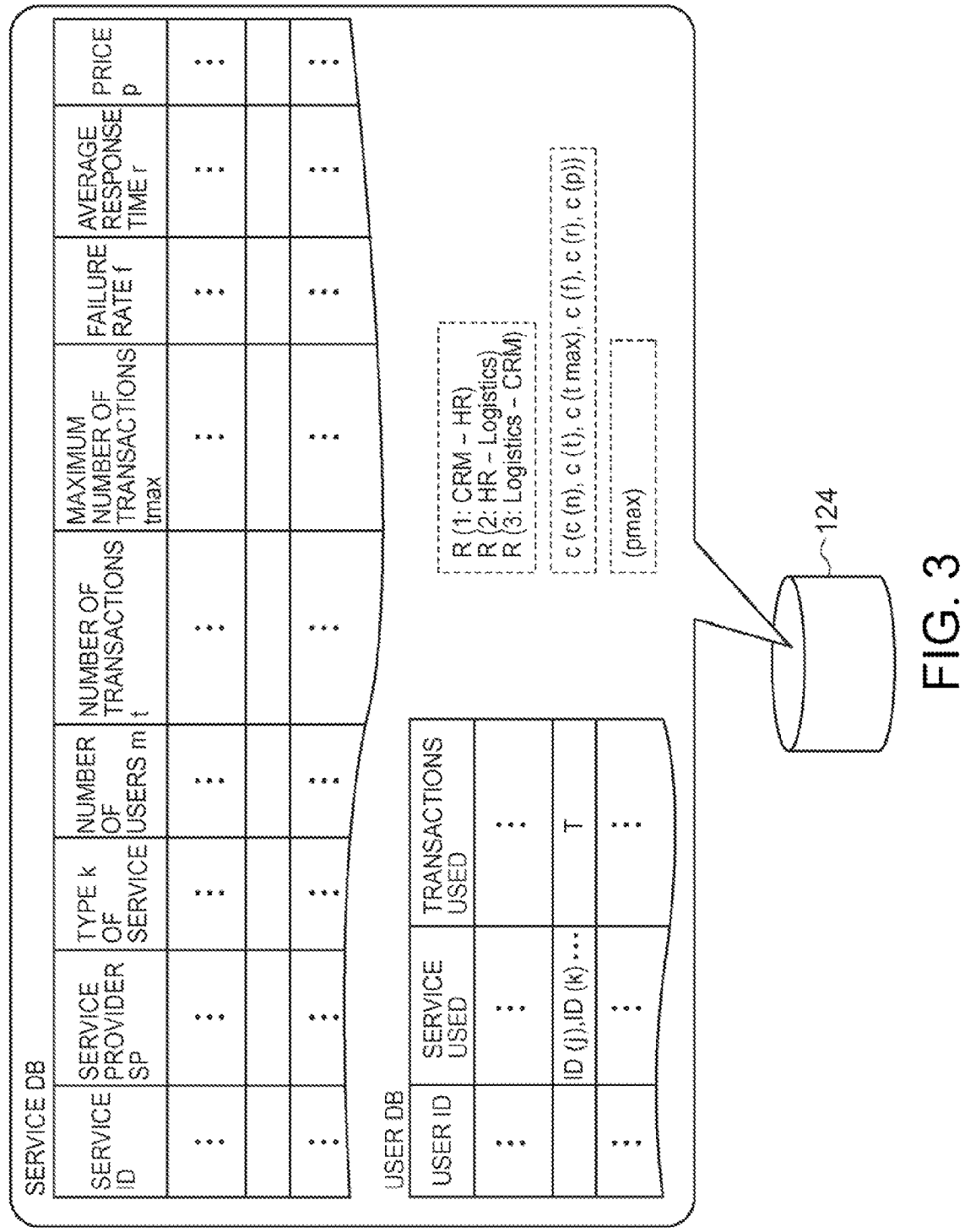
FIG. 3 is a diagram for schematically describing contents stored in a hard disk drive.

FIG. 3 is a diagram for schematically describing the contents stored in the hard disk drive 124. In the hard disk drive 124, a service DB and a user DB are stored. The service DB includes a service item ID for identifying a service, an item of a service provider SP for identifying a service provider providing the service, an item of a type k of service for identifying the type of the service, an item of the number of users n for indicating the number of users using (subscribe to) the service, an item of the number of transactions t indicating the number of (cumulative) transactions for the service used (during a certain period of time), an item of the maximum number of transactions tMAX for indicating the number of transactions per unit of time when the service can be used, an item of a failure rate f for indicating the failure rate of the service, an item of an average response time r for indicating the average response time for the service, and an item of a price p for indicating the price of the service. Also, the user DB includes an item of a user ID for identifying a user, an item of a used service for identifying a service used (subscribed to) by the user, and an item of the number of transactions T for indicating the (cumulative) number of transactions for the service actually used by the user (during a certain period of time). Such information is inputted in advance. Both transaction items, t and T are appropriately updated according to use by users. Note that in the hard disk drive 124, other information is also stored, which will be described later.

And now, a system integrator (a trader who collectively undertakes businesses such as planning, building, and operation of an information processing system corresponding to the problems after having analyzed the contents of businesses of a client) shown in FIG. 1 provides the following services to the service integrator. Briefly, although the service integrator could provide a user with integrated services in which a plurality of services is combined, the service integrator could not propose combinations of services meeting the requirements of the user from among multiple combinations. On the other hand, if it is possible to have the user evaluated combinations of services, and to propose a combination of services having received high evaluation marks to the user, it enables to provide integrated services more satisfying the requirements of the user. Here, the case in which the system integrator adds a new function to the integration server 1 to provide higher value-added services to users will be described as the embodiment.

Figure 4:
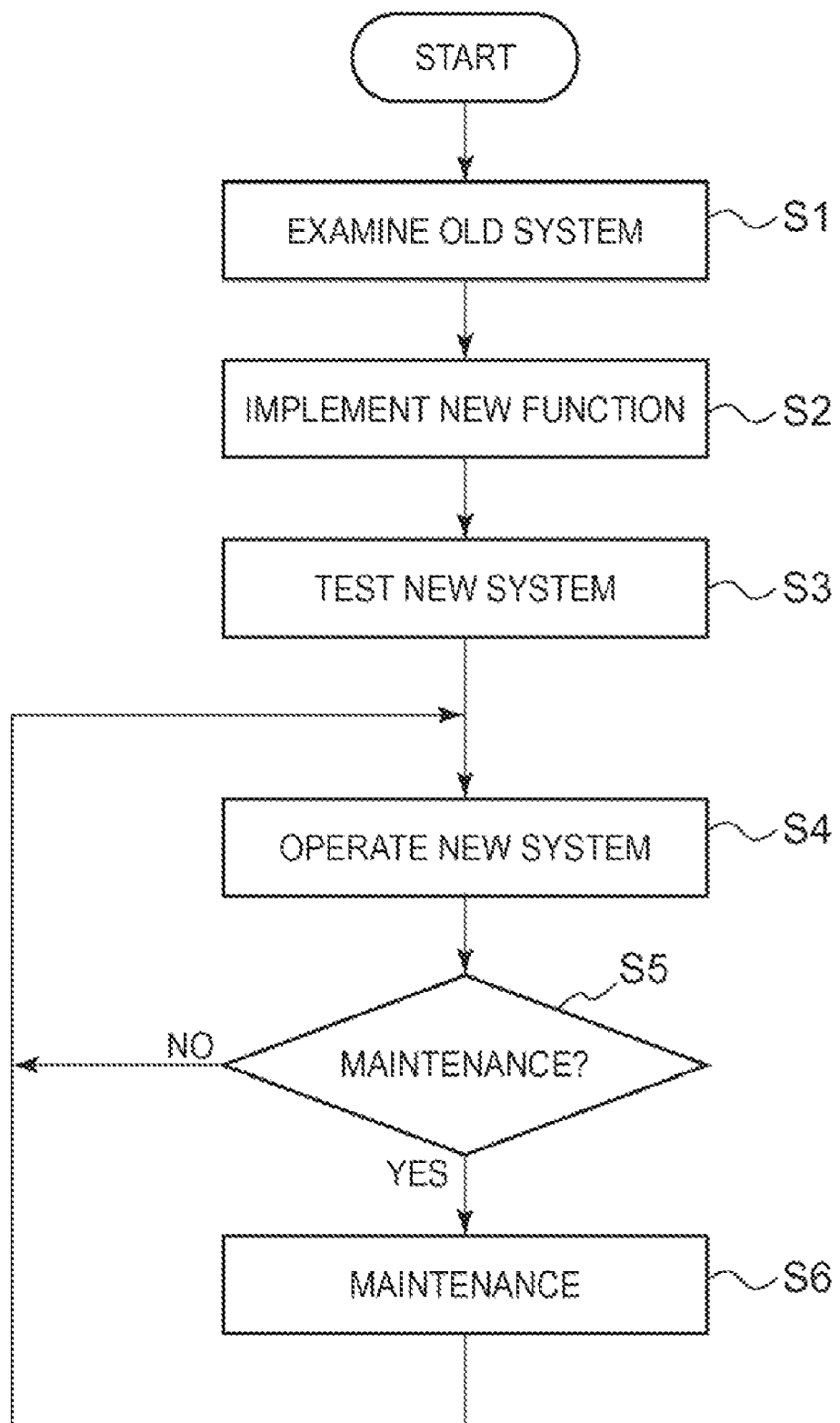
FIG. 4 is a flowchart for describing a procedure performed by a system integrator from when expanding the function of the integration server to when doing maintenance.

FIG. 4 is a flowchart for describing a procedure performed by the system integrator from when expanding the function of the integration server 1 to when doing maintenance. First, the system integrator examines an integration server (an old system) 1 in the current state (S1 in FIG. 4). According to the examination, the system integrator identifies a function to be newly implemented on the integration server 1. The system integrator develops a computer program product exercising the new function and installs the same on the integration server 1, thereby implementing the new function (S2 in FIG. 4). The system integrator conducts testing to determine whether or not an integration server (new system) 1' implemented with the new function properly exercises desired functions (the new function and a conventional function) (S3 in FIG. 4). After the testing is completed, the system integrator brings the integration server 1' into operation (S4 in FIG. 4). Thereafter, according to a need (S5 in FIG. 4), the system integrator does maintenance (S6 in FIG. 4). Note that details of the implemented new function will be disclosed in the operation of the system (S4 in FIG. 4).

Figure 5:
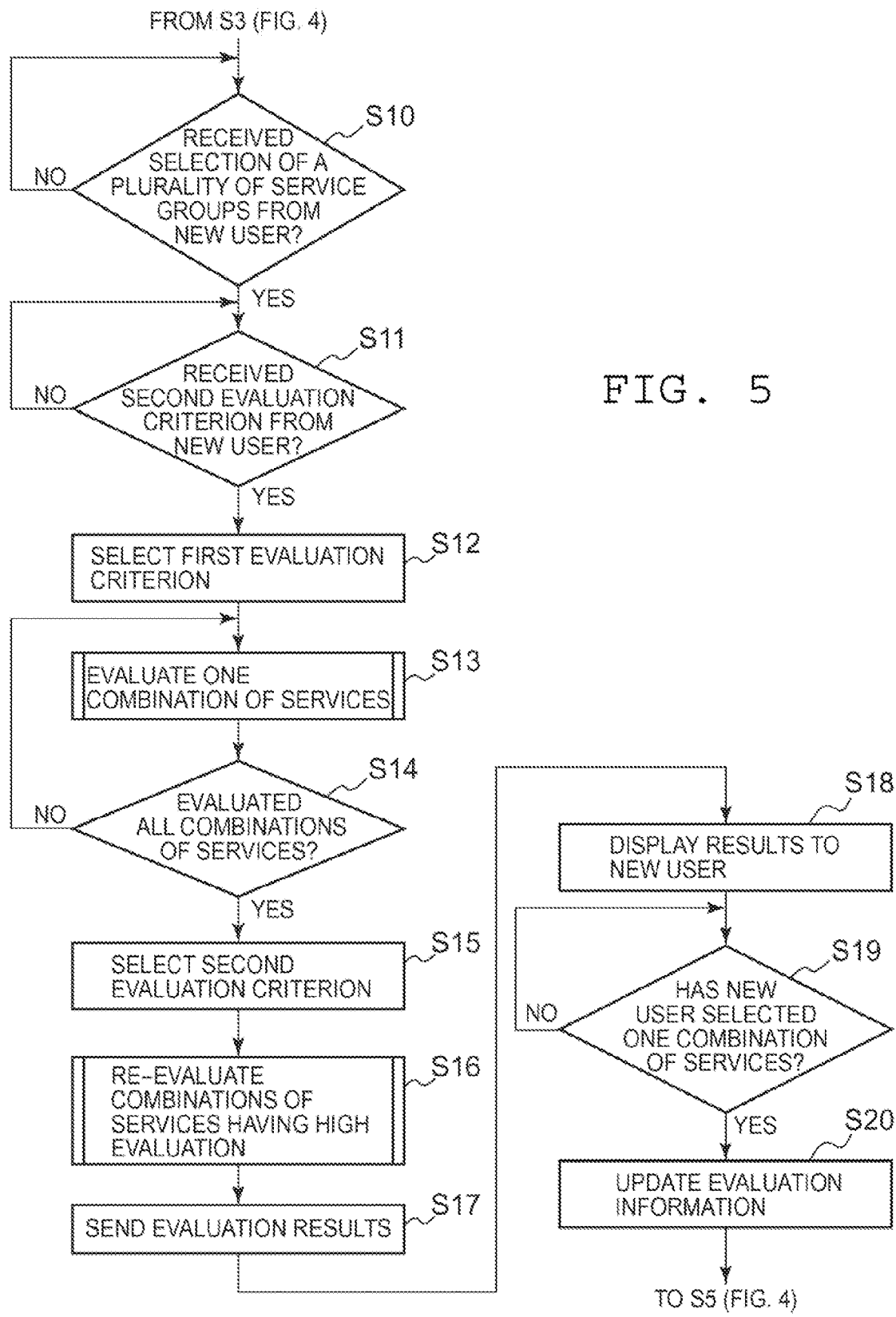
FIG. 5 is a flowchart for more specifically describing an operation of the system.

FIG. 5 is a flowchart for more specifically describing the operation of the system (S4 in FIG. 4). The integration server 1' starts a process on condition that the integration server 1' receives a selection of a plurality of service groups from a client 2(N+1) of a new user C (N+1) via the Internet 3 (S10 in FIG. 5), and receives a second evaluation criterion (S11 in FIG. 5). Here, the description will be performed taking, as an example, the case that the new user C(N+1) selects, as service groups, three types of service groups, a customer relation management (hereinafter referred to as "CRM") service group, a human resources (hereinafter referred to as "HR") service group, and a logistics (hereinafter referred to as "LOGISTICS") service group. In addition, here, the description will be performed taking, as an example, the case that the new user inputs, as the second evaluation criterion, an upper limit pmax of the prices of combinations of services. The upper limit pmax is stored in the hard disk drive 124.

Subsequently, the integration server 1' selects a first evaluation criterion (S11 in FIG. 5). The first evaluation criterion represents a plurality of coefficients c (c(n), c(t), c(tmax), c(f), c(r), and c(p)) which are stored in the hard disk drive 124 upon implementing the new function (S2 in FIG. 4) (the coefficients are all constant numbers). Then, based on information stored in the service DB, information stored in the user DB, a plurality of relevant information R (R1, R2, and R3) (each of them is a constant number) stored in the hard disk drive 124 upon implementing the new function (S2 in FIG. 4), and the first evaluation criterion, the integration server 1' quantifies one combination of services and evaluates the combination (S13 in FIG. 5). Generally, there are a lot of such combinations of services. For example, when the CRM service group has one (1) piece of service, the HR service group has m pieces of services ("m" is a natural number), and the LOGISTICS service group has n pieces of services ("n" is a natural number), there are (l×m×n) ways of combinations of services. The integration server 1' evaluates all those combinations of services (S13 and S14 in FIG. 5).

Figure 6:
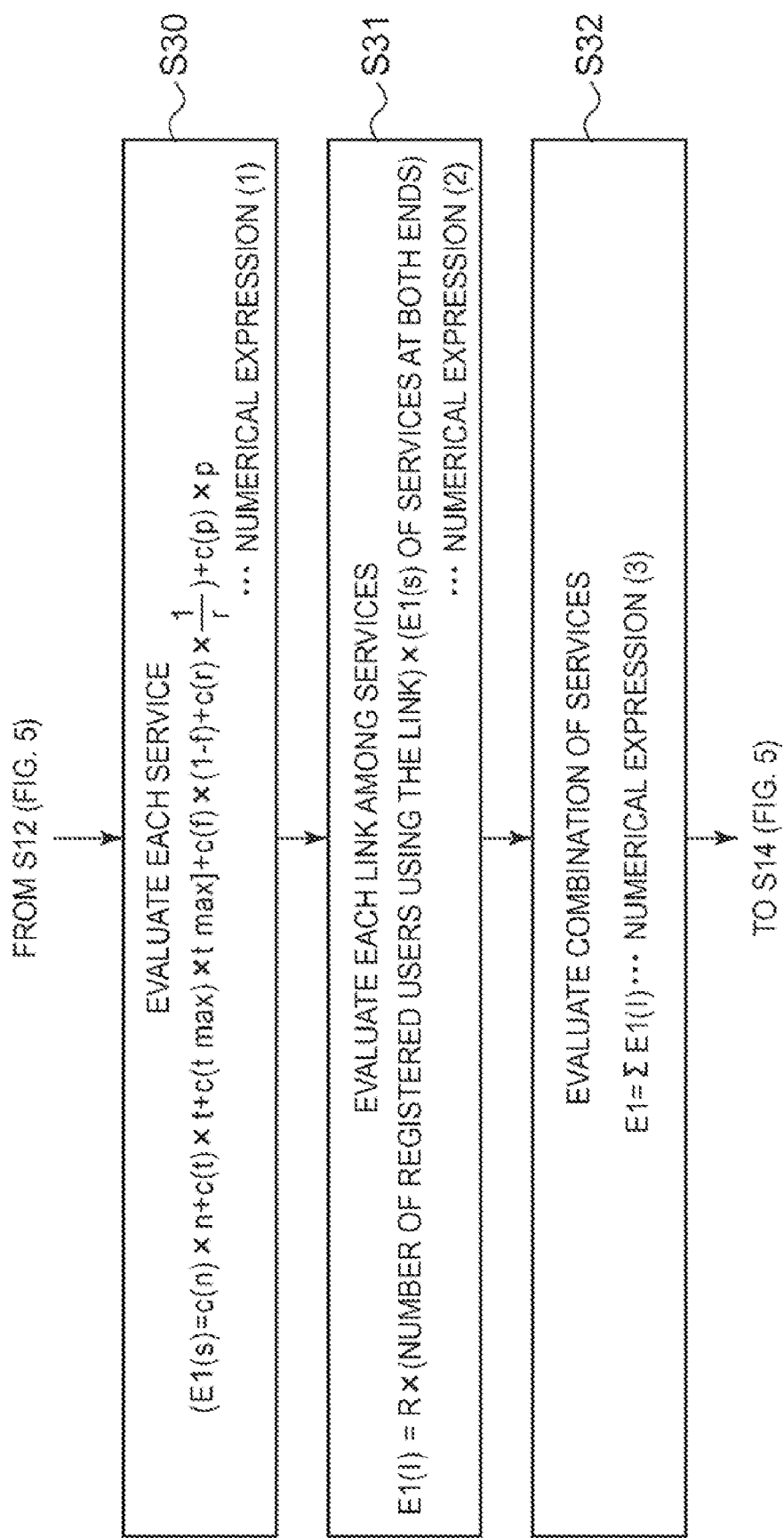
FIG. 6 is a flowchart for more specifically describing a step of quantifying one combination of services to evaluate the same.

FIG. 6 is a flowchart for more specifically describing a step (S13 in FIG. 5) of quantifying one combination of services and evaluates the combination. First, the integration server 1' quantifies each of services composing one combination of services and evaluates the service to obtain an evaluation value E1(s) of the service (S30 in FIG. 6). Here, description will be performed assuming that the new user C (N+1) selects, as service groups, the foregoing three types (CRM, HR, and LOGISTICS) of service groups (S10 in FIG. 5). In this case, the integration server 1' quantifies one service s(i) selected from one CRM service group to evaluate the same, quantifies one service s(j) selected from m pieces of HR service groups to evaluate the same, and quantifies one service s(k) selected from n pieces of LOGISTICS service groups to evaluate the same. For example, in case of seeking an evaluation value E1(s(i)) of the service s(i), the integration server 1' can obtain the same according to the numerical expression (1) shown in S30 in FIG. 6, based on the number of users n using (subscribe to) the service s(i), the number of transactions t in which the service s(i) was used, the maximum number of transactions tMAX per unit of time when the service s(i) can be used, the failure rate f of the service s(i), the average response time r of the service s(i), and the price p indicating the price of the service s(i), and coefficients (the first evaluation criterion c), c(n), c(t), c(tmax), c(f), c(r), and c(p) corresponding to each of the above items, which are stored in the service DB. Similarly, it is possible to seek an evaluation value E1(s(j)) of the service s(j) and an evaluation value E1(s(k)) of the service s(k).

Subsequently, the integration server 1' quantifies each link among the services composing one combination of services and evaluates the same to obtain an evaluation value E1 (l) thereof (S31 in FIG. 6). Here, the integration server 1' obtains an evaluation value E1(ij) of a link between the service s(i) being a CRM service and the service s(j) being an HR service, an evaluation value E1(jk) of a link between the service s(j) being an HR service and the service s(k) being a LOGISTICS service, and an evaluation value E1(ki) of a link between the service s(k) being a LOGISTICS service and the service s(i) being a CRM service. For example, in case of seeking the evaluation value E1(ij) of the link between the service s(i) and the service s(j), it is possible to obtain the same according to the numerical expression (2) shown in S31 in FIG. 6, based on relevant information R1, the number of existing users N(ij) using both of the service s(i) and the service s(j), and the evaluation value E1(s(i)) of the service s(i) and the evaluation value E1(s(j)) of the service s(j) which are obtained at the previous step (S30 in FIG. 6). That is to say, it is possible to seek the evaluation value E1 (ij) of the link according to the numerical expression that the evaluation value E1 (ij)=relevant information R1×the number of existing users N (ij)×(evaluation value E1(s(i))+evaluation value E1(sj)). Note that the relevant information R1 is a value proportional to a general degree of association between the CRM service and the HR service. Also, it is possible to seek the number of existing users N by searching and counting the user DB. Similarly, it is possible to seek the evaluation value E1(jk) of the link between the service s(j) and the service s(k), and the evaluation value E1(ki) of the link between the service s(k) and the service s(i).

Then, the integration server 1' quantifies one combination of services and evaluates the same to obtain an evaluation value E1 thereof (S32 in FIG. 6). Here, an evaluation value E1(ijk) of the combination of the service s(i) being a CRM service, the service s(j) being an HR service, and the service s(k) being a LOGISTICS service are obtained. It is possible to seek the evaluation value E1(ijk) according to the numerical expression (3) shown in S32 in FIG. 6, based on the evaluation values E1(ij), E1(jk), and E1(ki) of the links which were obtained at the previous step (S31 in FIG. 6). That is to say, it is possible to seek the evaluation value E1(ijk) of the combination of services according to the numerical expression that the evaluation value E1(ijk)=evaluation values E1(ij)+E1(jk)+E1(ki).

Similarly, the integration server 1' obtains an evaluation value E1 (a first evaluation result) for all of (l×m×n) ways of combinations of services (S13 and S14 in FIG. 5).

Subsequently, the integration server 1' selects a second evaluation criterion (S15 in FIG. 5). Then, based on the second evaluation criterion, the integration server 1' re-evaluates combinations of services (a plural number) having received high evaluation marks in the previous evaluations (S13 and S14 in FIG. 5) and thereby obtains a second evaluation result (S16 in FIG. 5).

Figure 7:
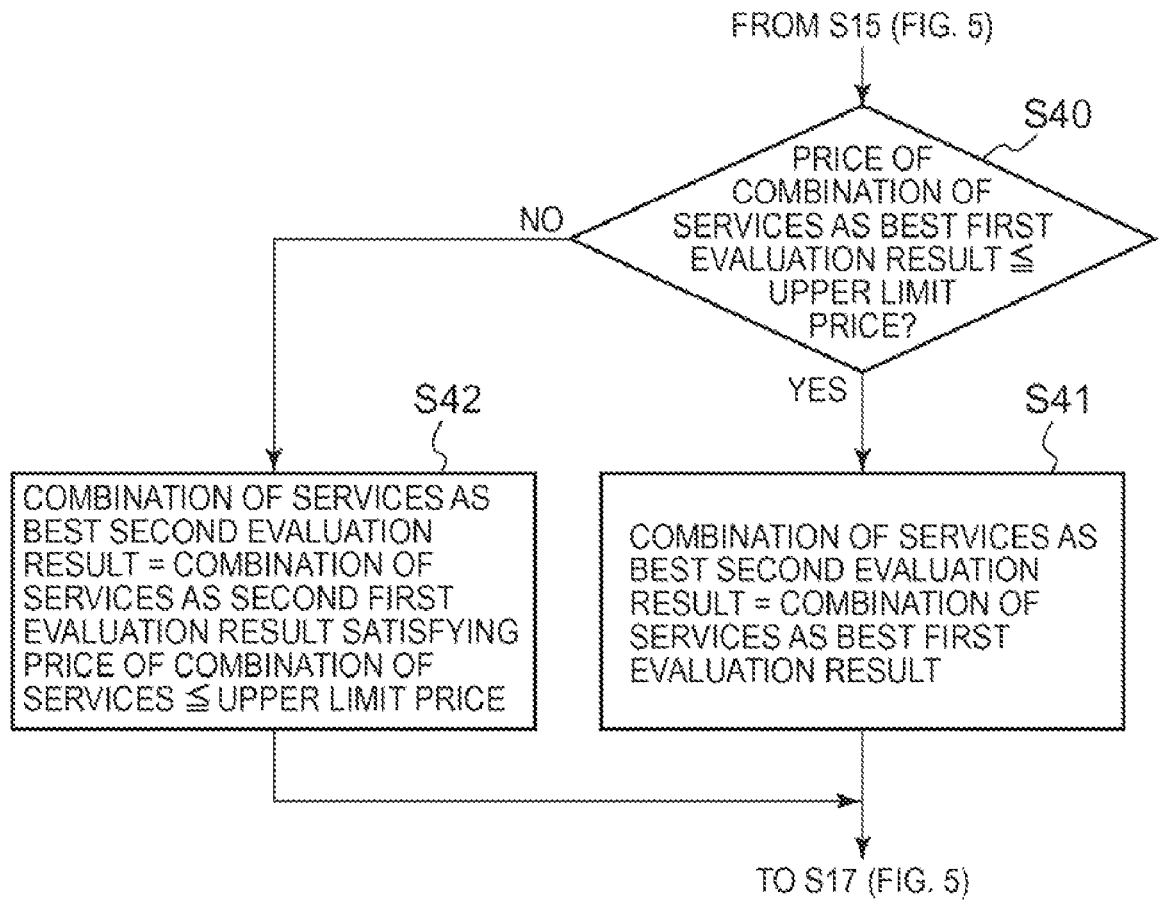
FIG. 7 is a flowchart for more specifically describing a step of re-evaluating combinations of services (a plural number) receiving high evaluation marks.

FIG. 7 is a flowchart for more specifically describing a step (S16 in FIG. 5) of re-evaluating combinations of services (a plural number) having received high evaluation marks. First, the integration server 1' calculates the prices of a combination of services having the highest evaluation value E1 from among the (l×m×n) ways of combinations of services. For example, when the evaluation value E1(ijk) of the combination of the service s(i) being a CRM service, the service s(j) being an HR service, and the service s(k) being a LOGISTICS service is the highest, the integration server 1' computes the price of that combination by summing up the price of the service s(i), the price of the service s(j), and the price of the service s(k). Note that the price of each service is stored in the service DB. When the price of the combination of services is compared with an upper limit price pmax having received from the new user C(N+1) as the second evaluation criterion (S40 in FIG. 7), and the price of the combination is lower than or equal to the upper limit price pmax, such combination is stored as a combination of the best second evaluation result (S41 in FIG. 7). On the other hand, when the price of the combination is higher than the upper limit price pmax, a combination of services of a next first evaluation result whose price is lower than or equal to the upper limit price pmax is stored, as a combination of the best second evaluation result (S42 in FIG. 7).

Then, the integration server 1' sends these evaluation results to the client 2(N+1) (S17 in FIG. 5). The client 2(N+1) having received the evaluation results graphically displays the evaluation results to the new user C(N+1)(S18 in FIG. 5).

An exemplary window screen displayed on a display apparatus of the client 2(N+1) might contain the top 10 sets of combinations of services listed in descending order of the first evaluation results (including a combination of services of the best first evaluation result) and a combination of services of the best second evaluation result are displayed. Each combination of services is composed of one service selected from the CRM service group, one service selected from the HR service group, and one service selected from the LOGISTICS service group. Services being included in each combination of services are represented by circular nodes, and by linear links connecting among the nodes.

Here, nodes and links showing a combination of services corresponding to the best first evaluation result, nodes and links showing a combination of services corresponding to the best second evaluation result, and nodes and links showing the remaining combinations of services may differ in the display format thereof (thickness and colors). As a result, for example, it becomes apparent that if not considering the price, it is best to select a service s(1) as a CRM service, a service s(d) as an HR service, and a service s(iii) as a LOGISTICS service, and that, if considering the price (among combinations of services not exceeding the upper limit price), it is best to select a service s(4) as a CRM service, a service s(b) as an HR service, and a service s(ii) as a LOGISTICS service. In addition, it is possible to make the representation format of a node showing each service to differ according to the evaluation value E1(s) of each service. For example, it is possible to represent a node having a relatively high evaluation value E1(s) as being thicker and to represent a node having a relatively low evaluation value E1(s) as being thinner. In addition, it is possible to make the representation format of a link showing a link among respective services to differ according to the evaluation value E1(1) of a link among respective services. For example, it is possible to represent a link having a relatively high evaluation value E1(1) as being thicker, and to represent a link having a relatively low evaluation value E1(1) as being thinner.

Figure 8:
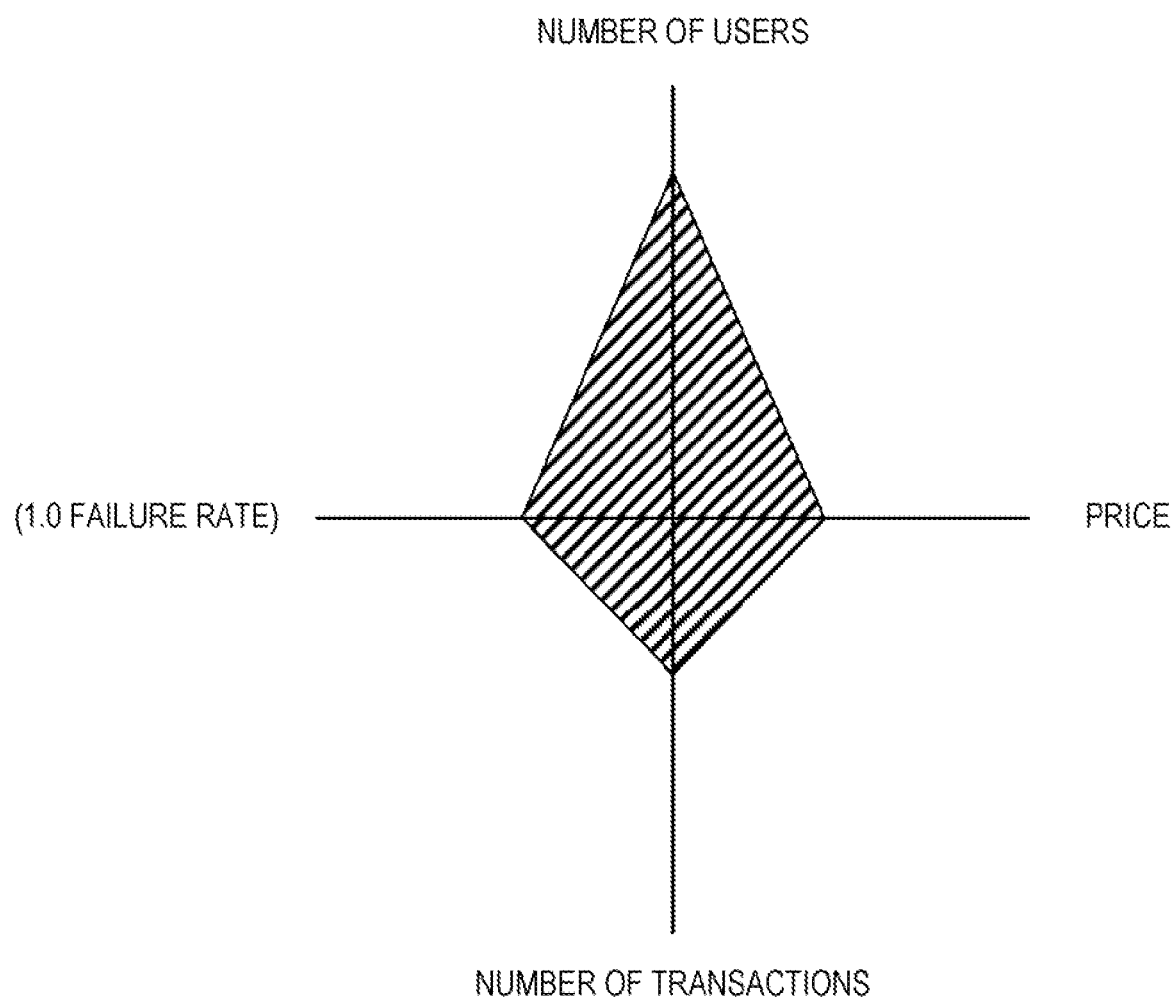
FIG. 8 shows another exemplary window screen displayed on the display apparatus of the client.

Furthermore, when the new user C(N+1) selects each node, the evaluation of a corresponding service may be displayed. FIG. 8 shows an exemplary window screen displayed on the display apparatus of the client 2(N+1). Here, the evaluation of a certain service is displayed in the form of a radar chart centering on the number of users using (subscribing to) the service, the number of transactions, the failure rate, and the price. Note that the number of users is displayed, however, each user's anonymity is ensured.

When the new user C(N+1) selects one combination of services (S19 in FIG. 5), as a result of reviewing the evaluation results, the integration server 1' updates the number of users n of a relevant service in the service DB and registers the new user C(N+1) in the user DB (S20 in FIG. 5). Also, when the new user C(N+1) actually uses the service, the integration server 1' updates the number of transactions t of a relevant service in the service DB and the number of relevant usage transactions T in the user DB (S20 in FIG. 5).

One embodiment of the present invention was described as above. Nonetheless, it is a matter of course that the present invention is not limited to the present embodiment. It is also possible to set, as the second evaluation criterion, the degree of reliability (probability of not breaking down) instead of the upper limit price. Furthermore, it is also possible to set coefficients c:(c(n), c(t), c(tmax), c(f), c(r), and c(p)) which are different from the first evaluation criterion according to the policy of a user. For example, when the user places more emphasis on reliability, it is possible to set the coefficient c(r) as to be a greater value. In addition, when the user places more emphasis on cost, it is possible to set the coefficient c(p)as to be a greater value. Furthermore, in case of seeking the evaluation value E1(ij) of a link, it is allowed to use the number of transactions T(ij) of existing users instead of the number of existing users N(ij).

What is claimed is:

1. A method applied to a system having a storage device, an input/output device and an arithmetic processing unit, wherein
   a plurality of service groups and evaluation information are stored in the storage device;
   each service group includes a plurality of the same type of services;
   the evaluation information includes single-service information corresponding to a single service used by a user, relevant information corresponding to a general relevance degree among the service groups and the number of other users using different types of services;
   the method comprises the steps of:
   receiving selections of a plurality of service groups from one user by the input/output device;
   selecting one service from each service group among the selected plurality of service groups;
   computing an evaluation of composed service combinations based upon the evaluation information by the arithmetic processing unit;
   computing an evaluation value of the selected service based on a maximum number of transactions per unit of time the selected service was used;
   quantifying links between the services in one of the service groups;
   obtaining an evaluation value of the links between the services in one of the service groups based on the relevant information and a number of existing users using the services, and the evaluation value of each of the selected services;
   calculating a highest evaluation value from a plurality of the combinations of the services in one of the service groups;
   computing an evaluation value between two of the selected services based on the single-service information corresponding to the single service used by the user, the information corresponding to a general relevance degree among the service groups and the number of other users using different types of services;
   computing the evaluation of the combination of services as a sum of evaluation values between any two services; and
   displaying the evaluation of the combination of services on a display device.

2. The method according to claim 1, wherein
   the plurality of services are a plurality of Web services provided by a plurality of service providers via the Internet.

3. The method according to claim 1, wherein
   the single service information includes any metrics of a number of other users using the single service, a number of transactions using the single service, a price of the single service, a failure rate of the single service, an average response time of the single service and a number of transactions that the single service can process per unit of time.

4. The method according to claim 1, wherein the method includes:
receiving an evaluation criterion of the combination of services from the one user by the input/output device; and
computing the combination of services based upon the evaluation information and the evaluation criterion by the arithmetic processing unit.

5. The method according to claim 4, wherein:
the evaluation information is digitalized and stored, and the evaluation criterion contains a coefficient corresponding to the digitalized evaluation information; and
the combination of services is digitalized and computed by multiplying the digitalized evaluation information by the corresponding coefficient.

6. The method according to claim 1, wherein
the system further comprises a communication device, and the communication device is connected to a service server providing each service via the Internet; and
the method comprises steps of:
monitoring a usage of each service via the Internet by the communication device; and
updating the evaluation information based upon a result of the monitoring.

7. The method according to claim 1, wherein
the system comprises a display unit;
the method further comprises providing an evaluation result to the one user by the display unit; and
providing a plurality of combinations of services as the evaluation result; and
prioritizing the combination of services with respect to an evaluation result and providing the combination to the one user.

8. The method according to claim 7, wherein the method further includes
securing anonymity of other users; and concurrently providing the evaluation result to the one user.

9. The method according to claim 7, wherein the method further includes
providing the plurality of selected service groups with a plurality of services included in each of the service groups and displaying the combination of services to the one user as the evaluation result.

10. The method according to claim 7, wherein the method further includes
providing the selected one service as a node, and displaying the combination of services as a link between a plurality of the nodes and the plurality of nodes.

11. The method according to claim 1, wherein
the evaluation information includes the number of users who use a certain combination of services and the number of users who use each of the services comprising the combination of services; and
the method further comprises the steps of:
receiving a selection of the combination of services from the one user by the input/output device; and
updating the number of users who use the combination of services and the number of users who use each of the services in response to receiving the selection of the combination of services by the input/output device.

12. The method according to claim 1, wherein
the evaluation information includes a number of transactions for using a certain combination of services and a number of transactions for using each of services comprising the combination of services; and
the method further comprises the steps of:
receiving a selection of the combination of services from the one user by the input/output device; and
receiving the selection and updating the number of transactions for using the combination of services and the number of transactions for using each of the services in response to the transaction of the one user thereafter.

* * * * *